Figure 1:
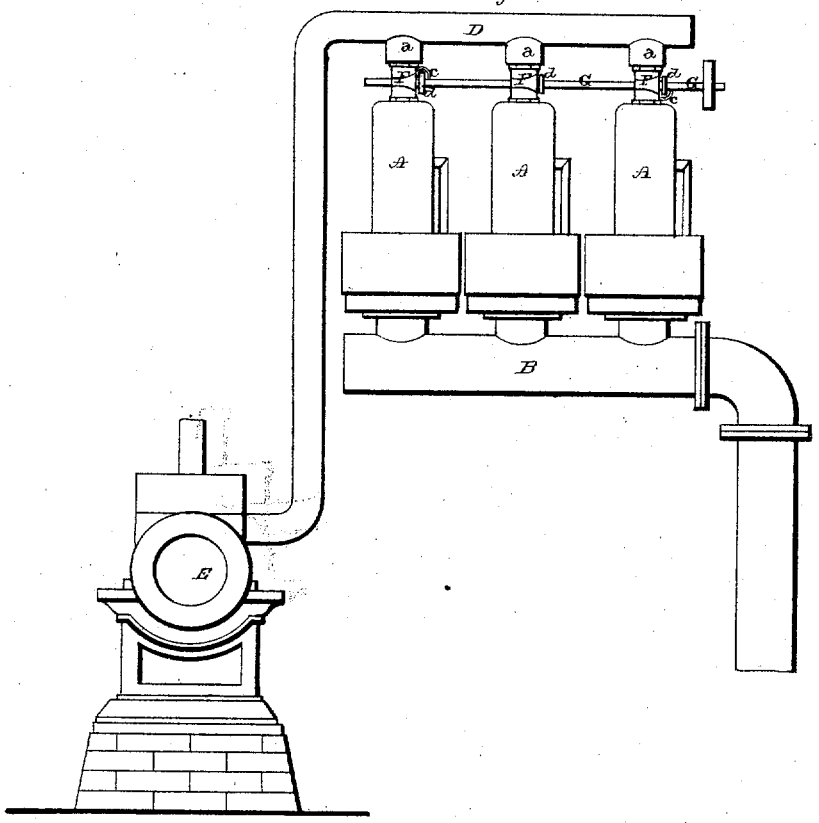

2 Sheets--Sheet 1.

W. BURDON.

Steam Vacuum Pumps.

No. 5,641. Reissued Nov. 4, 1873.

Witnesses.
Chandler Hall.
J Aug. Coley

Inventor.
Wm Burdon

A.W. PHOTO-LITHOGRAPHIC CO. N.Y. (MOURNES PROCESS)

2 Sheets--Sheet 2.
W. BURDON.
Steam Vacuum Pumps.
No. 5,641. Reissued Nov. 4, 1873.
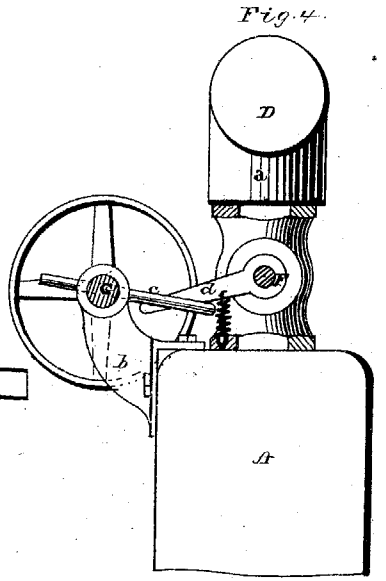
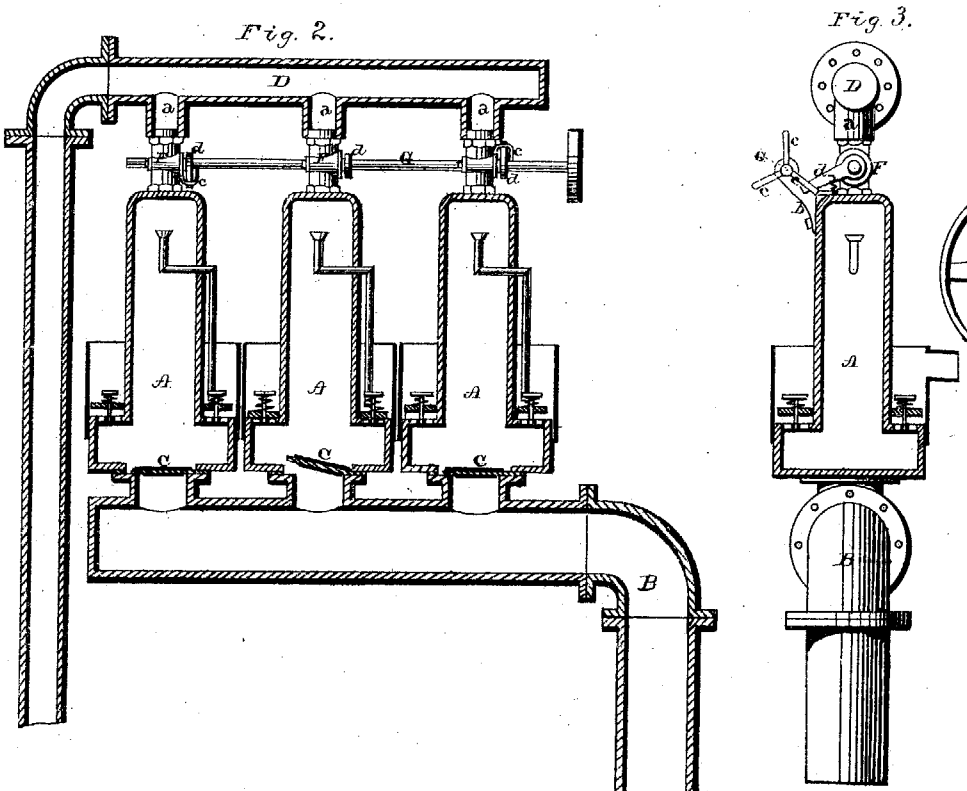
Witnesses.
Chandler Hall.
J. Aug^s Coley
Inventor.
Wm Burdon
AM. PHOTO LITHOGRAPHIC CO. N.Y. (OSBORNE'S PROCESS.)

UNITED STATES PATENT OFFICE.

WILLIAM BURDON, OF BROOKLYN, NEW YORK.

IMPROVEMENT IN STEAM VACUUM-PUMPS.

Specification forming part of Letters Patent No. 141,540, dated August 5, 1873; reissue No. 5,641, dated November 4, 1873; application filed September 11, 1873.

*To all whom it may concern:*

Be it known that I, WILLIAM BURDON, of the city of Brooklyn, in the county of Kings and State of New York, have invented certain new and useful Improvements in Steam Vacuum-Pumps; and do hereby declare that the following is a full, clear, and exact description thereof, that will enable others skilled in the art to which it appertains to make and use the same, reference being had to the accompanying drawings and to the letters of reference marked thereon, which form a part of this specification.

This invention relates to the combination of steam vacuum-pumps with a steam-engine, whereby the exhaust steam from the engine is made to produce the operation of the pumps, and the pumps are made to serve as a condenser to the engine. In such a combination, unless the engine works too slowly for practical efficiency, or the engine has an extremely long stroke, a single pump, or even two pumps taking steam alternately during successive strokes of the engine, cannot be made to condense all the steam, as the pumps cannot fill with water and discharge with sufficient rapidity. To overcome this difficulty, and to provide for working the pumps as slowly as necessary and yet to condense and use up all the steam of the engine, I use two or more pumps; and my improvement consists in the arrangement of such pumps, their connections, their steam-inlet valves, and mechanism for operating the said valves, whereby the desired ends are attained.

In the accompanying drawings, Figure 1 is an elevation of a steam-engine and a series of steam vacuum-pumps, illustrating my improvement. Fig. 2 is an elevation, partly in section, of the pumps and their connections and the valve-operating mechanism. Fig. 3 is an elevation corresponding with and at right angles to Fig. 2. Fig. 4 is also an elevation on a larger scale than Fig. 3, and is introduced for the purpose of more clearly showing the operating mechanism of the valves.

The pumps A A A, of which three are represented, but of which there may be a greater number, are arranged side by side, in a straight row. They may be of any suitable form, and have their details in the particulars not hereinafter specified of any known or practical construction, and may have separate suction-pipes, or be all connected, as represented, with one suction-pipe, B, the upper part of which is arranged horizontally below them, each having its own separate foot-valve C. The horizontal upper part of the suction-pipe receives its water at one end from the ascending portion of said pipe, so that water may be delivered to one after another of the several pumps through the series without having its momentum arrested.

Hitherto the class of pumps known as steam vacuum-pumps has been inefficient and liable to injury when in operation, because of the jar or water-hammer, which, in some instances, has been so violent as to open the joints of the pumps.

By the simple arrangement above described, the jar is entirely obviated. The exhaust-pipe D of the engine E is extended horizontally over the several pumps, and provided with a branch, *a*, for each pump. A steam-valve, F, is provided at the connection of each branch *a* with the top of the vacuum-chamber of each pump. The steam-valves may be of any suitable kind. I have represented them as simple stop-cocks. On one side of the row of pumps, parallel therewith and in suitable proximity to the valves, the valve-operating shaft G is horizontally arranged in suitable bearings *b b*. To this shaft are attached a series of wipers, *c c c*, one for each pump-valve, the said wipers being arranged in such relation to their respective valves as to be capable of opening them by acting on their attached levers *d d d*, and in such relation to each other that during the rotation of the shaft the valves will be opened one after another in regular succession and at regular intervals.

In order to operate the pump effectively and rapidly, it was found that the steam-inlet valves should be opened quickly, kept open for a certain space of time, and then immediately closed. The valve mechanism just described accomplishes these results, the parts being so arranged that the wipers in the outer part of their revolution engage the levers, and immediately raise them to the required height to open the valves, while in the upper part of the revolution of the wipers the levers are but very slightly raised, the valve thus being kept open. The moment the wipers are disengaged from the levers the valves are closed, the levers falling. The descent of the levers, and hence the closing of the valves, is accelerated by springs *e e e*, which are applied to each valve-lever.

Rotary motion may be imparted to the shaft G by the engine, or by any suitable means.

The vacuum-chamber of each pump should be of such capacity that the whole of an exhausted charge of steam from the cylinder of an engine could be condensed within it.

To provide for the use of all the exhaust steam from the engine for the purpose of pumping and its perfect condensation, the number of pumps, and the frequency with which their valves are severally opened and closed to produce their operation, will depend on the relation between the time required for the filling and discharge of each pump and the time occupied in each stroke of the engine, at least one pump being always in free open connection with the exhaust-pipe. The quicker the stroke of the engine the greater will be the number of pumps required. The best economy will be obtained, both as to the quantity of water raised and the vacuum produced, by having a full number of pumps, which should be slightly in excess of the requisite number. During the rotary motion of the valve-operating shaft G, producing the opening of the several valves F, and the operation of the several pumps, one after another, at regular intervals, one pump at least will always be in fully effective operation, and the exhaust-pipe of the engine is always open to a vacuum.

What I claim as my invention, and desire to secure by Letters Patent, is—

1. Two or more steam vacuum-pumps, each having a steam-inlet valve, in combination with the exhaust-pipe of a steam-engine and a revolving shaft provided with wipers, so arranged that the steam-inlet valves are opened in regular succession, as and for the purpose described.

2. Two or more steam vacuum-pumps, each having a steam-inlet valve, in combination with a revolving shaft, in which wipers are fixed for operating the steam-inlet valves, substantially as described.

3. The combination of the operating-shaft, the wiper, and the valve-lever, substantially as described.

4. The combination of the operating-shaft, the wiper, the valve-lever, and the spring operating the valve-lever, substantially as described.

5. A suction-pipe arranged horizontally, and receiving its water at one end, in combination with two or more steam vacuum-pumps, provided with steam-inlet valves and a valve-operating shaft, the various parts arranged to prevent the water-hammer, substantially as described.

In testimony that I claim the foregoing I have hereunto set my hand this 4th day of September, 1873.

WM. BURDON.

Witnesses:
CHANDLER HALL,
JOEL SMITH.